May 3, 1966 H. A. ROBINSON 3,249,887

FREQUENCY SYNTHESIZER

Filed March 31, 1964 2 Sheets-Sheet 1

INVENTOR.
HARRIS ALEXANDER ROBINSON

BY

Arthur L. Collins

ATTORNEY

INVENTOR.
HARRIS ALEXANDER ROBINSON
BY
Arthur L. Collins
ATTORNEY

United States Patent Office 3,249,887

Patented May 3, 1966

3,249,887

FREQUENCY SYNTHESIZER

Harris Alexander Robinson, Palmyra, N.J., assignor, by mesne assignments, to the United States of America as represented by the Secretary of the Navy Filed Mar. 31, 1964, Ser. No. 356,340

1 Claim. (Cl. 331—38)

The present invention relates to novel and improved frequency synthesizing apparatus and more particularly to apparatus for developing a large number of electrical oscillatory signals at predetermined decimal interval frequencies from a single high stability reference frequency source.

In various electronic applications, use of a signal generator that provides a plurality of signals at predetermined discreet frequencies often becomes highly desirable. Although various types of such multiple frequency signal generators have been devised in the past, considerable difficulty has been experienced heretofore in designing a frequency synthesizer which is relatively simple in construction and yet highly reliable and convenient in use.

It is therefore a principal object of the present invention to provide a novel and improved frequency synthesizer which includes no elaborate filters, phase locked loops, movable tuning slugs or switched or variable capacitors.

It is a further object of the present invention to provide a novel and improved frequency synthesizer having a high order of commonality of identical and interchangeable mixers, filters, multipliers, dividers and other component modules.

It is a further object of the present invention to provide a novel and improved frequency synthesizer which is capable of producing up to thirty thousand signals having unique frequencies at one kilocycle decimal intervals from a single high stability reference frequency source.

Figure 1A:
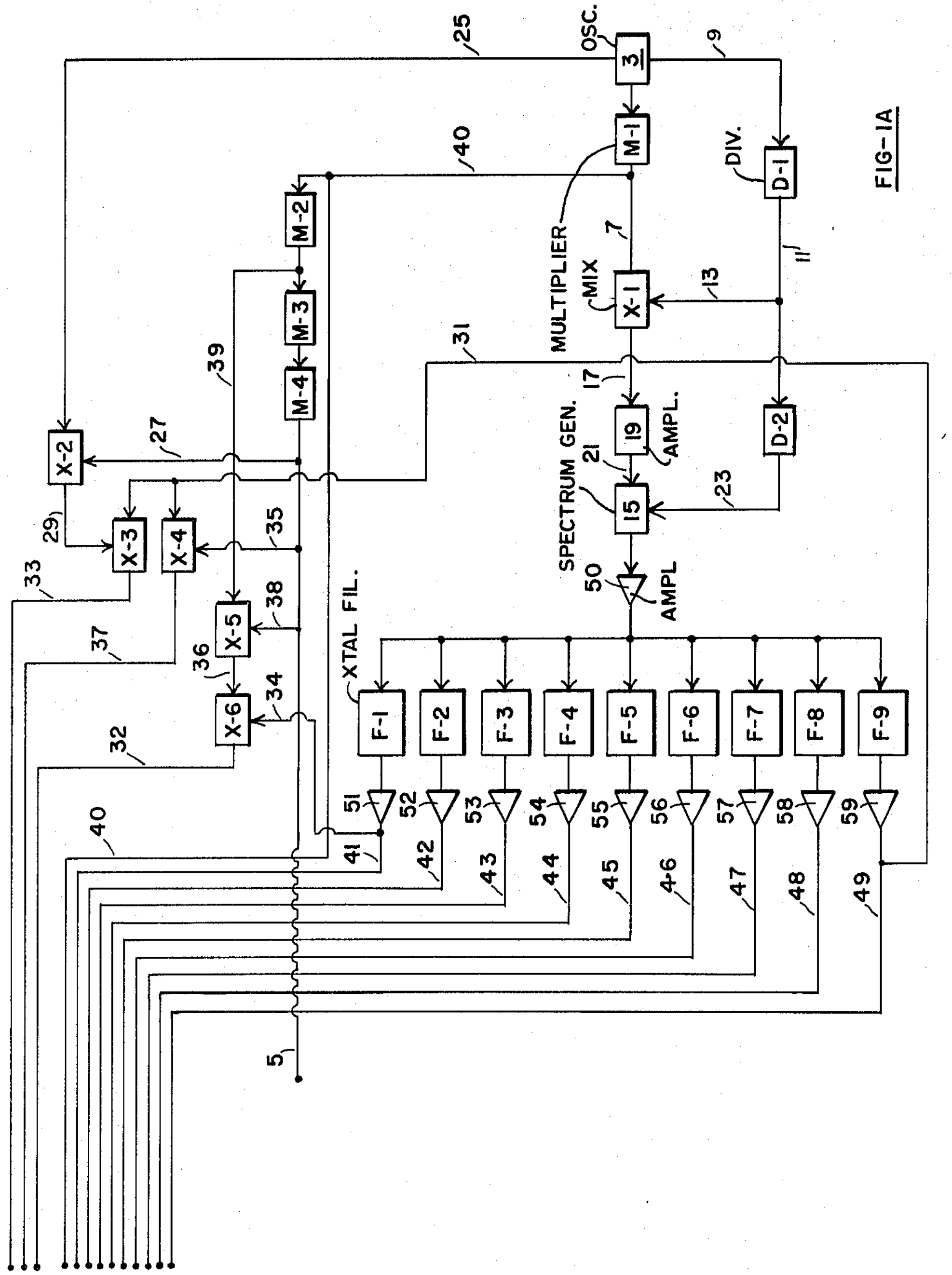
Figure 1B:
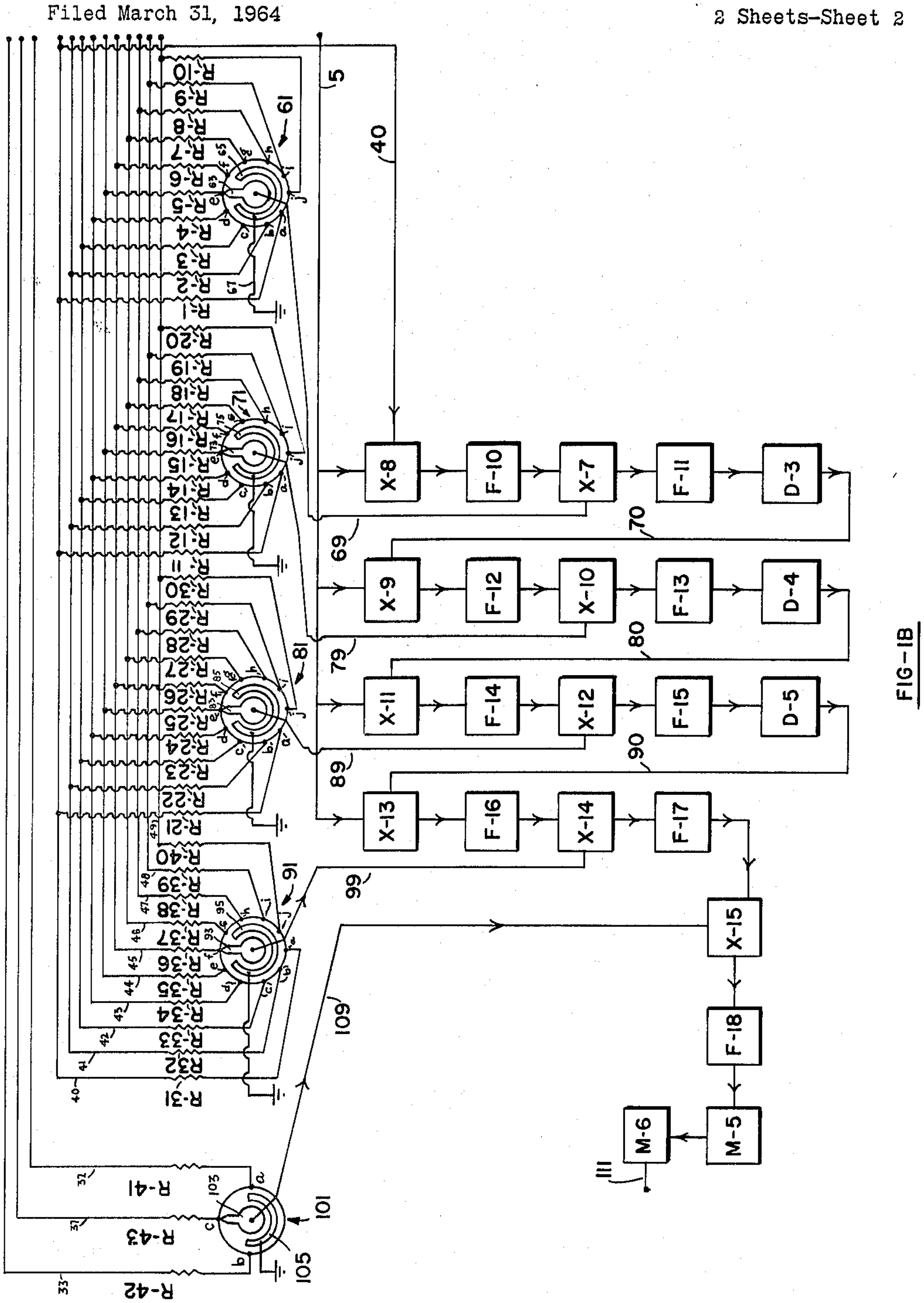

Other objects and many of the attendant advantages of this invention will be readily appreciated as the same becomes better understood by reference to the following detailed description when considered in connection with the accompanying drawings wherein:

FIGS. 1–A and 1–B when placed side by side illustrate a preferred embodiment of the present invention.

Referring now to the drawing, the conventional reference frequency oscillator 3 generates a 2 mc. signal which is successively doubled in the factor of two frequency multiplier circuits M–1, M–2, M–3 and M–4 to provide a 32 mc. frequency signal on conductor 5. The 4 mc. signal at the output of frequency multiplier M–1 is coupled to the mixer circuit X–1 through conductor 7. The 2 mc. signal from the standard reference oscillator 3 is also coupled to mixer X–1 through conductor 9, the factor of five frequency divider D–1 and conductors 11 and 13. The output circuit of mixer X–1 is coupled to the spectrum generator 15 through conductor 17, amplifier 19, and conductor 21. The output circuit of frequency divider D–1 is also coupled to the spectrum generator 15 through conductor 11, the factor of four frequency divider D–2 and conductor 23. The output circuit of spectrum generator 15 is connected to the 4.1 mc. signal line 41, the 4.2 mc. signal line 42, the 4.3 mc. signal line 43, the 4.4 mc. signal line 44, the 4.5 mc. signal line 45, the 4.6 mc. signal line 46, the 4.7 mc. signal line 47, the 4.8 mc. signal line 48, and the 4.9 mc. signal line 49 through amplifier 50 and respectively through crystal filters F–1 through F–9 and amplifiers 51 through 59.

The 2 mc. signal from the standard oscillator 3 is coupled to the mixer X–2 through conductor 25. The 32 mc. signal on conductor 5 is also coupled to the mixer X–2 through conductor 27. The output circuit of mixer X–2 is coupled to mixer X–3 through conductor 29. The 4.9 mc. line 49 is also connected to mixer X–3 through conductor 31. The 34.9 mc. signal, derived in a manner which will be more apparent hereinafter, in the output circuit of mixer X–3 energizes conductor 33.

The 32 mc. line 5 is connected to mixer X–4 through conductor 35. The 4.9 mc. line 31 is also connected to mixer X–4. The 36.9 mc. signal, derived in a manner which will be more apparent hereinafter, in the output circuit of mixer X–4 energizes conductor 37.

The 32 mc. line 5 is connected to mixer X–5 through conductor 38. The output circuit of frequency multiplier M–2 is also coupled to mixer X–5 through conductor 39. The output circuit of mixer X–5 is coupled to mixer X–6 through conductor 36. The 4.1 mc. line 41 is also coupled to mixer X–6 through conductor 34. The 35.9 mc. signal, derived in a manner which will be more apparent hereinafter, in the output circuit of mixer X–6 energizes conductor 32.

Referring now particularly to FIG. 1–B of the drawing, it will be noted that the ten contacts *a–j* on the stator of selector switch 61 are respectively connected to signal lines 40–49 through resistors R–1—R–10. The base of the rotor of switch 61 is preferably generally disk-shaped and is constructed of a suitable electrically non-conductive material. The centrally located electrically conductive arm 63 mounted on rotor extends outwardly radially and selectively engages contacts *a–j* on the stator. The sectored electrically conductive annulus 65 secured to the peripheral edge of the rotor is connected to ground through conductor 67 and engages each of the non-selected contacts on the stator. The variable arm 63 of switch 61 is connected to mixer X–7 through conductor 69. The 32 mc. line 5 and the 4 mc. line 40 are each connected to input circuits of the mixer X–8. The output circuit of mixer X–8 is coupled to mixer X–7 through bandpass filter F–10.

The output circuit of mixer X–7 is coupled to mixer X–9 through the bandpass filter F–11, the factor of ten frequency divider D–3 and conductor 70. Mixer X–9, which is also energized by the 32 mc. signal on conductor 5, is coupled to mixer X–10 through bandpass filter F–12. Selector switch 71 is similar to switch 61 described hereinabove and includes the variable arm 73, ten stator contacts *a–j* which are respectively connected to lines 40–49 through resistors R–11—R–20, and the grounded sectored annulus 75. The variable arm 73 of switch 71 is connected to mixer X–10 through conductor 79.

The output circuit of mixer X–10 is coupled to mixer X–11 through bandpass filter F–13, the factor of ten frequency divider D–4 and conductor 80. Mixer X–11, which is also energized by the 32 mc. signal on conductor 5, is coupled to mixer X–12 through bandpass filter F–14. Selector switch 81 is similar to switch 61 described hereinabove and includes the variable arm 83, ten stator contacts *a–j* which are respectively connected to lines 40–49 through resistors R–21—R–30, and the grounded sectored annulus 85. The variable arm 83 of switch 81 is connected to mixer X–12 through conductor 89.

The output circuit of mixer X–12 is coupled to mixer X–13 through the bandpass filter F–15, the factor of ten frequency divider D–5 and conductor 90. Mixer X–13, which is also energized by the 32 mc. signal on conductor 5, is coupled to mixer X–14 through bandpass filter F–16. Selector switch 91 is similar to switch 61 described above and includes the variable arm 93, ten stator contacts *a–j* which are respectively connected to lines 40–49 through resistors R–31—R–40, and the grounded sectored annulus 95. The variable arm 93 of switch 91 is connected to mixer X–14 through conductor 99.

The output circuit of mixer X–14 is coupled to mixer X–15 through bandpass filter F–17. Selector switch 101 includes the variable arm 103, three stator contacts *a*, *b* and *c* which are respectively connected to lines 32, 33 and 37 through resistors R–41, R–42 and R–43 and the grounded sectored annulus 105. The variable arm 103 of switch 101 is connected to mixer X–15 through conductor 109. The output circuit of mixer X–15 is coupled to the output conductor 111 of the frequency synthesizer of the present invention through filter F–18, the factor of five frequency multiplier M–5 and the factor of two frequency multiplier M–6.

Inasmuch as the specific design of the above described mixers, filters, frequency multipliers and dividers, and the spectrum generator 15 may take any suitable conventional form and of themselves form no part of the present invention, a detailed description of the same is not provided herein for the sake of simplicity. For a complete understanding of the invention, it need only be understood that each of the similarly designed mixers X–1—X–15 combine their input signals in a circuit having a non-linear impedance such that upper and lower sideband frequency signals are developed, that the various fibers F–1—F–18 are designed to pass a particular sideband or other desired frequency, that the frequency dividers D–1—D–5 and the frequency multipliers M–1—M–6 lock on the desired multiples or submultiples of the input signal, and that the spectrum generator 15 is overmodulated to provide a plurality rather than a pair of sideband frequencies on either side of the 4.4 mc. input signal.

In operation, the frequency of the basic reference 2 mc. signal generated by oscillator 3 is doubled in the frequency multiplier M–1 to provide a 4 mc. signal on conductor 40. The frequency of the 4 mc. signal is then doubled again in frequency multiplier M–2 to provide a 8 mc. signal on conductor 39. The frequency of the 8 mc. signal is then doubled and redoubled in frequency multipliers M–3 and M–4 to provide a 32 mc. signal on conductor 5.

The frequency of the 2 mc. signal on conductor 9 is also subdivided by a factor of five in frequency divider D–1 to provide a .4 mc. signal on conductor 11. The frequency of the .4 mc. signal is then subdivided by a factor of four in frequency divider D–2 to provide a .1 mc. signal on conductor 23, which energizes the spectrum generator 15. The 4 mc. signal on conductor 7 and the .4 mc. signal on conductor 13 are then combined in the non-linear circuit of mixer X–1 to provide a 4.4 mc. sideband signal on conductor 17 which is passed through amplifier 19 to spectrum generator 15. The 4.4 mc. signal and the .1 mc. signal on conductor 23 are combined in the overmodulated generator 15 to provide 4.1 mc., 4.2 mc., 4.3 mc., 4.4 mc., 4.5 mc., 4.6 mc., 4.7 mc., 4.8 mc. and 4.9 mc. signals which are amplified in amplifier 50 and respectively passed through filters F–1—F–9 and amplifiers 51–59 to conductors 41–49.

The 2 mc. signal from reference oscillator 3 on conductor 25 is also combined with the 32 mc. signal on conductor 27 in the non-linear circuit of mixer X–2 to provide a 30 mc. sideband signal on conductor 29. The 30 mc. signal and the 4.9 mc. signal on conductor 31 are then combined in the non-linear circuit of mixer X–3 to provide a 34.9 mc. sideband signal on conductor 33.

The 8 mc. signal on conductor 39 is combined in the non-linear circuit of mixer X–5 with the 32 mc. signal on conductor 35 to provide a 40 mc. sideband signal on conductor 36. The 40 mc. signal and the 4.1 mc. signal on conductor 34 are then combined in the non-linear circuit of mixer X–6 to provide the 35.9 mc. sideband signal on conductor 32.

The 32 mc. signal on conductor 35 is combined in the non-linear circuit of mixer X–14 with the 4.9 mc. signal on conductor 31 to provide the 36.9 mc. sideband signal on conductor 37.

The 32 mc. signal on conductor 5 is then combined in the non-linear circuit of mixer X–8 with the 4 mc. signal on conductor 40 to provide a 36 mc. sideband signal which is fed through the 36 mc. to 36.1 mc. bandpass filter F–10 to mixer X–7. The variable arm 63 of switch 61 is then set to combine a selected signal on conductors 40–49 with the 36 mc. signal from filter F–10 in the non-linear circuit of mixer X–7 to provide any of the ten 100 kc. separated sideband signals between 40 mc. and 40.9 mc. This band of ten signals is then passed through the 40 mc. to 41 mc. bandpass filter F–11 to frequency divider D–3 where the frequency of each signal is subdivided by a factor of ten.

Any of the resulting ten 10 kc. separated signals between 4 mc. and 4.09 mc. are then combined in the non-linear circuit of mixer X–9 with the 32 mc. signal on conductor 5 to provide ten 10 kc. separated signals between 36 mc. and 36.09 mc. which are fed through the 36 mc. to 36.1 mc. bandpass filter F–12 to mixer X–10. The variable arm 73 of switch 71 is then set to combine a selected signal on conductors 40–49 with any of the ten signals between 36 mc. and 36.09 mc. from filter F–12 in the non-linear circuit of mixer X–10 to provide any of the one hundred 10 kc. separated sideband signals between 40 mc. and 40.99 mc. This band of one hundred signals is then passed through the 40 mc. to 41 mc. bandpass filter F–13 to frequency divider D–4 where the frequency of each signal is subdivided by a factor of ten.

Any of the resulting one hundred 1 kc. separated signals between 4 mc. and 4.099 mc. are then combined in the non-linear circuit of mixer X–11 with the 32 mc. signal on conductor 5 to provide one hundred 1 kc. separated signals between 36 mc. and 36.099 mc., which are fed through the 36 mc. to 36.1 mc. bandpass filter F–14 to mixer X–12. The variable arm 83 of switch 81 is then set to combine a selected signal on conductors 40–49 with any of the one hundred signals between 36 mc. and 36.099 mc. from filter F–14 in the non-linear circuit of mixer X–12 to provide any of the one thousand 1 kc. separated sideband signals between 40 mc. and 40.999 mc. This band of one thousand signals is then passed through the 40 mc. to 40.1 mc. bandpass filter F–15 to frequency divider D–5 where the frequency of each signal is subdivided by a factor of ten.

Any of the resulting one thousand .1 kc. separated signals between 4 mc. and 4.0999 mc. are then combined in the non-linear circuit of mixer X–13 with the 32 mc. signal on conductor 5 to provide one thousand .1 kc. separated signals between 36 mc. and 36.0999 mc., which are fed through the 36 mc. to 36.1 mc. bandpass filter F–16 to mixer X–14. The variable arm 93 of switch 91 is then set to combine a selected signal on conductors 40–49 with any of the one thousand signals between 36 mc. and 36.0999 mc. from filter F–16 in the non-linear circuit of mixer X–14 to provide any of ten thousand .1 kc. separated sideband signals between 40 mc. and 40.9999 mc.

This band of ten thousand signals is then passed through the 40 mc. to 41 mc. bandpass filter F–17 to the mixer X–15. The variable arm 103 of switch 101 is then set to combine a selected signal on conductor 32, 33 or 37 with any of the ten thousand signals between 40 mc. and 40.9999 mc. from filter F–17 in the non-linear circuit of mixer X–15 to provide any of the thirty thousand .1 kc. separated difference sideband signals between 3.1 mc. and 6.1 mc. This band of thirty thousand signals is then passed through the 3.1 mc. to 6.1 mc. bandpass filter F–18 and through frequency multipliers M–5 and M–6 which increase the frequency of each signal by a factor of ten to provide the desired thirty thousand 1 kc. separated signals between 3.1 mc. and 6.1 mc.

Obviously, many modifications and variations of the present invention are possible in the light of the above teachings. It is therefore to be understood that within the scope of the appended claim, the invention may be practiced otherwise than as specifically described.

What is claimed is:

An electronic frequency synthesizer comprising:

(a) a reference oscillator which generates a 2 megacycle signal;

(b) means coupled to the reference oscillator for generating a 4 megacycle signal;

(c) means coupled to the reference oscillator for generating a 32 megacycle signal;

(d) a spectrum generator which is coupled to the reference oscillator and which provides nine 100 kilocycle separated signals between 4.1 megacycles and 4.9 megacycles;

(e) means coupled to the reference oscillator for generating 34.9 megacycle, 35.9 megacycle and 36.9 megacycle signals;

(f) means for combining the 4 megacycle and the 32 megacycle signals and filtering the resulting output signals to obtain a 36 megacycle signal;

(g) means for combining the 36 megacycle signal with any of the signals between 4 megacycles and filtering the resulting output signals and 4.9 megacycles to obtain ten 100 kilocycle separated signals between 40 megacycles and 40.9 megacycles;

(h) means for subdividing the frequency of the signals between 40 megacycles and 40.9 megacycles by a factor of ten to obtain ten 10 kilocycle separated signals between 4 megacycles and 4.09 megacycles;

(i) means for combining the ten signals between 4 megacycles and 4.9 megacycles with the 32 megacycle signal and filtering the resulting output signals to obtain ten 10 kilocycle separated signals between 36 megacycles and 36.09 megacycles;

(j) means for combining the signals between 36 megacycles and 36.09 megacycles with any of the signals between 4 megacycles and 4.9 megacycles and filtering the resulting output signals to obtain one hundred 10 kilocycle signals between 40 megacycles and 40.99 megacycles;

(k) means for subdividing the frequency of the signals between 40 megacycles and 40.99 megacycles by a factor of ten to obtain one hundred one kilocycle separated signals between 4 megacycles and 4.099 megacycles;

(l) means for combining the hundred signals between 4 megacycles and 4.099 megacycles with the 32 megacycle signal and filtering the resulting output signals to obtain one hundred one kilocycle separated signals between 36 megacycles and 36.099 megacycles;

(m) means for combining the hundred signals between 36 megacycles and 36.099 megacycles with any of the signals between 4 megacycles and 4.9 megacycles and filtering the resulting output signals to obtain one thousand one kilocycle separated signals between 40 megacycles and 40.999 megacycles;

(n) means for subdividing the frequency of the signals between 40 megacycles and 40.999 megacycles by a factor of ten to obtain one thousand one hundred cycle separated signals between 4 megacycles and 4.0999 megacycles;

(o) means for combining the thousand signals between 4 megacycles and 4.0999 megacycles with the 32 megacycle signal and filtering the resulting output signals to obtain one thousand one hundred cycle separated signals between 36 megacycles and 36.0999 megacycles;

(p) means for combining the signals between 36 megacycles and 36.0999 megacycles with any of the signals between 4 megacycles and 4.9 megacycles and filtering the resulting output signals to obtain ten thousand one hundred cycle separated signals between 40 megacycles and 40.9999 megacycles;

(q) means for combining the signals between 40 megacycles and 40.9999 megacycles with the 34.9 megacycle, the 35.9 megacycle, and the 36.9 megacycle signals and filtering the resulting output signals to obtain thirty thousand one hundred cycle separated signals between 3.1 megacycles and 6.1 megacycles; and (r) means for multiplying the frequency of the signals between 3.1 megacycles and 6.1 megacycles by a factor of then to obtain thirty thousand one kilocycle separated signals between 31 megacycles and 61 megacycles.

References Cited by the Examiner

UNITED STATES PATENTS

| | | | |
|---|---|---|---|
| 2,829,255 | 4/1958 | Bolie | 331—39 |
| 2,930,988 | 3/1960 | Boff | 331—38 |
| 2,934,716 | 4/1960 | Smith | 331—39 |
| 2,957,144 | 10/1960 | Huhn | 331—40 |

FOREIGN PATENTS

| | | |
|---|---|---|
| 148,412 | 9/1952 | Australia. |

ROY LAKE, *Primary Examiner.*

JOHN KOMINSKI, *Examiner.*